Nov. 29, 1960  K. F. RENTSCHLER  2,961,935
PHOTOGRAPHIC SHUTTER

Filed Sept. 24, 1957  2 Sheets-Sheet 2

INVENTOR.
*Karl F. Rentschler*
BY
*Munn, Liddy, Daniels & March*

ATTORNEYS

United States Patent Office 2,961,935
Patented Nov. 29, 1960

2,961,935
PHOTOGRAPHIC SHUTTER

Karl F. Rentschler, Calmbach, Enz, Germany, assignor to Alfred Gauthier G.m.b.H., Calmbach, Enz, Germany, a corporation of Germany Filed Sept. 24, 1957, Ser. No. 685,939
Claims priority, application Germany Mar. 23, 1957
5 Claims. (Cl. 95—63)

This invention relates to photographic shutter structures and more particularly to such structures having shutter-drive mechanisms and wherein a speed-retarding means is provided to obtain different shutter speeds.

In the past, in shutters of the above type, different speeds have been effected by controlling the amount of travel of the driving or actuating element of a speed retarding mechanism. For a greater speed, the amount of travel was lessened, and for slower speeds, the amount of travel was increased. Such prior construction has been particularly employed where a large number of different speeds was desired. While this prior adjusting structure operated generally in a satisfactory manner, it had certain functional drawbacks and was complicated, requiring appreciable structure involving added expense. For one thing, the arrangement as outlined above necessitated the use of calibrated or adjusted return springs in order to obtain uniformity of the different speeds, where the amount of travel of the driving member was of small extent.

The above disadvantages of this prior construction have been obviated by the present invention, and one object of the invention is to provide a novel and improved shutter structure with speed retarding mechanism which is so constituted that it requires no critical components while still enabling a high degree of accuracy and uniformity to be obtained. The improved speed-retarding mechanism of the present invention, moreover, is simpler and less expensive in that during the assembly of the components no adjustment or calibration is required, for a number of the different speeds which may be obtained.

In accomplishing the above objective, in accordance with the invention, a number of different degrees of retardation is obtained utilizing the same amount of travel of the actuating element of a speed retarding mechanism, by clutching or declutching an anchor or star wheel with respect to a gear train which is driven by the shutter driving member. Moreover, reciprocable anchor or escapement members each adapted for engagement with the anchor or star wheel, may be optionally engaged with such wheel either individually or simultaneously, and an easy selection of these various operations is obtained by the speed setting member of the shutter structure, preferably by the provision of cams associated therewith.

An improved shutter structure as above constituted in accordance with the invention has the advantage over prior speed-retarding devices, that a great number of different shutter speeds may be obtained with the same amount or degree of travel of the actuating element of the improved speed retarding device, which organization eliminates the necessity for precise adjustment or calibration during the assembly of the various components while still providing a high degree of accuracy and reliability.

In the accompanying drawings, similar characters of reference are used wherever possible to indicate corresponding parts throughout the several figures.

Figure 1:
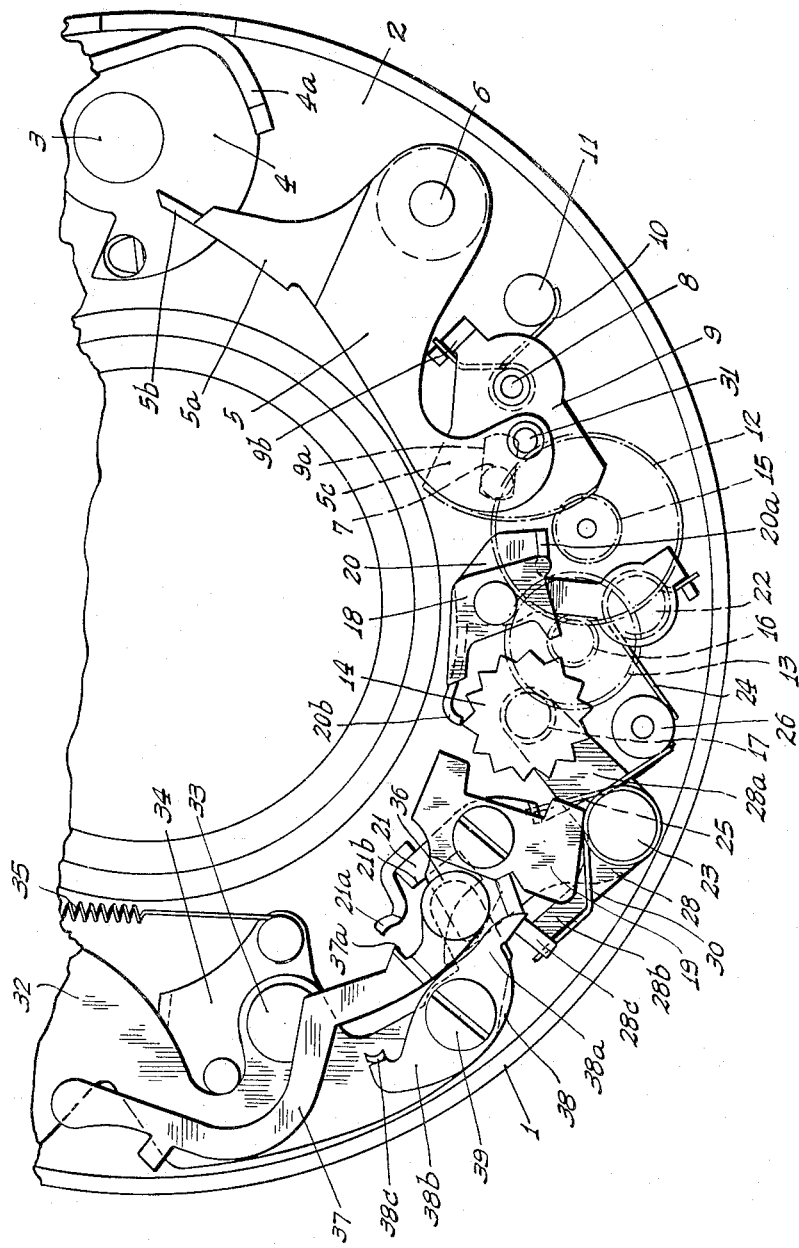
Figure 1 is a fragmentary, enlarged elevational view of a photographic lens shutter structure having incorporated therein the delay or retarding mechanism as provided by the invention. The shutter is shown in cocked position, and there have been omitted for the sake of clarity the supporting or bearing plates, the speed-setting ring, and also the cover plate of the shutter structure.

Referring to Fig. 1, the housing of the photographic lens shutter structure is indicated by the numeral 1. Within the housing 1 there is disposed in the well-known manner a shutter base plate 2, which constitutes a support for the various well-known parts of the shutter mechanism. For example, the base plate 2 has rigidly secured to it a spindle 3 about which a cocking and driving member 4 pivots, such member 4 actuating in a well-known manner the usual shutter blade ring (not shown for reasons of clarity).

In accordance with the present invention, within the housing 1 and on the base plate 2 there is provided a novel and improved gear and anchor or escapement, retarding mechanism, by which different speeds of exposure may be easily and quickly obtained in a very reliable manner and with a minimum number of inexpensive parts.

For the sake of clarity of illustration, the front and rear supporting or bearing plates for such retarding mechanism are not illustrated herein. However, such bearing and supporting plates are well-known as to their function and structure, and by themselves do not constitute novel or patentable subject matter.

The improved retarding mechanism of this invention includes an actuating member in the form of a two-armed lever 5 which is pivotally carried on a fixed spindle 6 supported by the above mentioned bearing plates. One arm 5a of the lever 5 has a bent lug 5b adapted to cooperate with a part 4a of the cocking and driving member 4 so as to be driven thereby during the running-down movement of the member 4. The other arm 5c of the lever 5 mounts a pin 7 which extends through a longitudinal hole or slot 9a in a toothed segment 9 pivotally mounted on a spindle 8 and biased by a spring 10. The toothed segment 9 is normally urged clockwise, having a lug 9b engaged by one end of the spring 10, the remaining end of said spring being engaged by a fixed post 11 carried by the bearing plate of the retarding mechanism.

The toothed segment 9 meshes with a pinion 15 which is affixed to a gear 12 meshing with and driving a second pinion 16 affixed to a gear 13. The gear 13 meshes with a pinion 17 which is fixed to a star or anchor wheel 14, and the pinions 17, 16 and 15 together with the gears 13 and 12 thus constitute a gear train between the lever 9 and the star wheel 14.

In accordance with the present invention, I obtain a number of different speeds for effecting different shutter exposures, all with the same amount of movement of the driving member 4 and actuation lever 5. In accomplishing this, I provide for connecting and disconnecting the anchor or star wheel 14 with respect to the gear train driven by the lever 5; that is, I provide a clutch device by which, at the option of the user, the star wheel 14 may be driven from the gear train, or else the gear train may carry through its running down movement without the impeding influence of the star wheel 14 by disconnecting the latter and allowing it to remain motionless.

Moreover, I provide a pair of anchor or escapement members which may be optionally engaged either individually or simultaneously with the anchor or star wheel 14. The clutching or declutching of the star wheel 14, and the engagement or disengagement of the escapement members is made responsive to positioning of the speed-setting member of the shutter structure, preferably by the provision of cam grooves in said member.

For the purpose of clutching or declutching the star wheel 14, I turnably mount such wheel on an arm 28a of an angular or bell-crank lever 28, which lever is pivotally carried by a spindle 23 fixed to the shutter structure. The bell crank or lever 28 is spring biased clockwise by a wire spring 30 wrapped around the spindle 23, such spring thereby tending to maintain engagement between the pinion 17 and the cooperable gear wheel 13. The spring 30 at one end engages an arm 28b of the lever or bell crank 28, and at its other end engages a stationary pin 26.

To control the clutching and declutching of the star wheel 14 I provide a control groove 27a in a speed-setting ring 27 (Fig. 2), and effect an angular movement of the lever 28 in response to turning movement of the speed-setting ring 27.

In the specific embodiment of the invention illustrated herein, there is arranged for engagement with the edges of the cam slot 27a a transmission or cam follower device in the form of a two-armed lever 38 turnably carried by a spindle 39 which is fixedly mounted on a plate 32 of a delayed-action device. One arm 38a of the lever 38 cooperates with a bent-up lug 28c of the lever 28, whereas the other arm 38b has an upstanding lug 38c extending laterally of the lever and adapted to project into the cam slot 27a.

It will be seen from an inspection of Fig. 1 that the gear plate 32 of the delayed action device, beside mounting the lever 38 also has a second lever 37 provided with a nose 37a which is cooperable with a part of the shutter blade ring (not shown) in order to hold the latter stationary during the running-down movement of the delayed-action device. Such delayed-action device is driven by the usual spring 35 engaging a segment wheel 34, as will be readily understood. The delayed action device as such constitutes no portion per se of the present invention, and accordingly further details thereof will not be given here.

In the illustrated embodiment of the invention the escapement members which cooperate with the starwheel 14 are indicated at 18 and 19, and have different dimensions. For the purpose of causing engagement and disengagement of said escapement members with and from the star wheel 14 each one of such members is supported on a different control lever. The member 18 is shown as pivotally mounted on a lever 20, while the escapement member 19 is pivotally carried on a lever 21. The levers 20 and 21 are respectively mounted on fixed spindles 22 and 23 which are carried on a supporting plate of the retarding mechanism, and such levers are shiftable against the action of springs 24 and 25 respectively. The lever 20 is normally spring biased counterclockwise, whereas the lever 21 is spring biased clockwise.

The two springs for the levers are carried respectively by the fixed pins 22 and 23, and one end of each spring engages the fixed post 26, whereas the remaining ends of the springs engage their respective levers, as clearly shown in Fig. 1.

Figure 2:
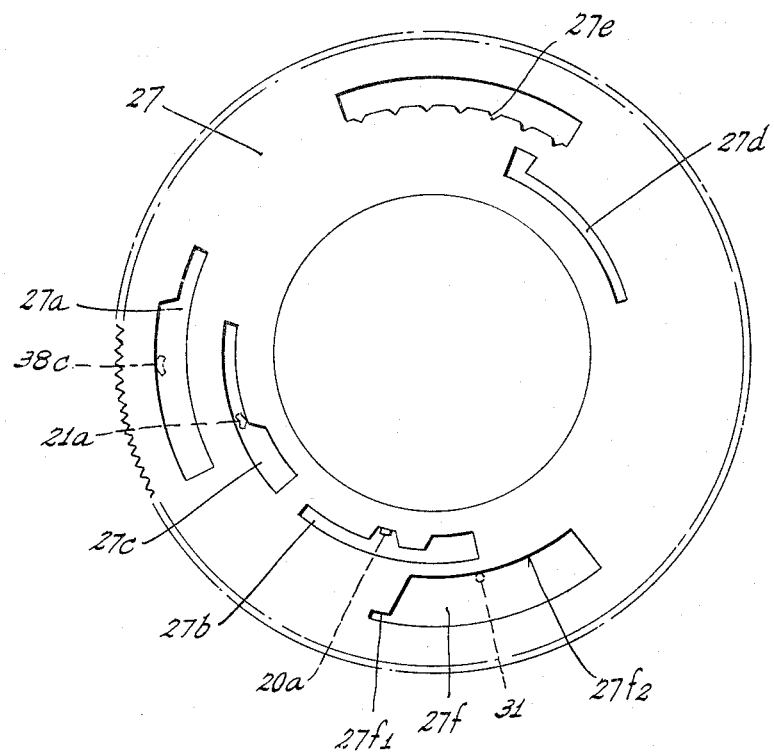
Fig. 2 is a front elevational view of a speed setting ring for the shutter structure shown in Fig. 1.

Control of the levers 20 and 21, and thus engagement or disengagement of the escapement members 18 and 19 with respect to the anchor or star wheel 14 is effected by means of control slots 27b and 27c which are disposed in the speed-setting ring 27. In accomplishing this, the levers 20 and 21 have lugs 20a and 21a respectively, such lugs being adapted to extend through the slots 27b and 27c as shown. The positions of the lugs 38c, 20a and 21a shown in Fig. 2 are effected by a setting of the speed-setting ring 27 which causes the star wheel 14 and pinion 17 to be connected with the gear 13 and gear train associated therewith, and to cause the escapement member 18 to be engaged with, and the escapement member 19 to be disengaged from the star wheel 14.

In order to disengage the escapement members 18 and 19 from the star wheel 14 after an exposure has been effected, the levers 20 and 21 may be actuated by arms 20b and 21b respectively, which arms cooperate with portions of the shutter blade ring (not shown). The cooperation of the arms 20b and 21b with said ring is such that the latter frees the levers at the opening movement of the shutter blades, and shifts the levers against the action of the springs 24 and 25 at the closing movement of the shutter blades. Thus, for the opening movement of the shutter blades, the escapement members may be operable as determined by the setting of the speed setting ring 27, whereas at the closing movement of the shutter blades the escapement members 18 and 19 are made to be inoperative by virtue of the action of the shutter blade ring.

The speed setting ring 27 further has a cam slot 27d for use with a well-known (not shown) control lever for B— exposures, and has additionally an arcuate slot 27e for use with a well-known (not shown) detent device, by means of which the ring 27 may be frictionally or yieldably held in its various setting positions coordinated to the different speeds and different positions of the lugs 38c, 21a, and 20a.

The speed setting ring 27 further has an arcuate slot 27f which effects a control of the extent of movement of the driving lever 5 of the shutter blade drive. As seen in Fig. 2, the control slot 27f has two steps, that is, a step 27f1 corresponding to complete switching off of the retarding mechanism (corresponding to the shortest speed setting) and a step 27f2 by which the driving lever 5 is given its full extent of movement, thereby to effect a proper control of the retarding mechanism. With this organization, when the driving lever 5 is allowed to have its full extent of movement, five different speeds or retarding steps may be obtained with the structure as above set forth.

Operation of the improved speed-retarding mechanism of the invention is briefly as follows:

Before carrying out an exposure, the speed setting ring 27 is set to the speed desired. This is done in the well-known manner, by means of a speed scale cooperating with a usual setting mark. When the shutter is cocked, the lug or pin 31 carried by the lever 5 engages the inner edge of the control slot 27f of the speed setting ring 27, under the action of a light spring 10.

If the pin 31 is in the portion 27f2 of the slot 27, a shifting movement of the lever 5 takes place when the part 4a of the cocking or driving member 4 strikes the lug 5d of the lever 5. Such action, however, occurs only after the shutter blades are completely opened by the initial movement of the member 4, as will be readily understood. After the part 4a has left the lug 5d of the lever 5, the closing movement of the shutter blades begins. The duration of exposure, or time during which the shutter blades remain fully opened, is determined by the time which is required for the cocking and driving member 4 to move the lever 5 counter-clockwise to a position wherein the part 4a may bypass the lug 5b.

By turning the speed-setting ring 27 to its various positions not only is the cam slot 27f brought into certain positions with respect to the pin 31, but also the cam slots 27a, 27b and 27c are operative to influence the star wheel 14 and the two escapement members 18 and 19.

Depending on the particular position of the speed setting ring 27, the shutter is controlled in accordance with the retarding mechanism of the present invention, to have the following speeds:

(a) With a certain setting of the speed setting ring 27 the star wheel 14 may be declutched or disengaged from the gear train, and also the two escapement members 18 and 19 may be made inoperative. The retarding action to which the shutter is now subjected is effected only by the gear train ending with the gear wheel 13. This provides a very short exposure.

(b) By another setting of the speed setting ring 27 the star wheel 14 may be clutched or engaged with the gear train, such engagement occurring by virtue of the pinion 17 meshing with the gear wheel 13. The escapement members 18 and 19 may remain inoperative or disengaged from the star wheel 14. This provides a somewhat slower speed than the setting (a) above.

(c) For another position of the speed-setting ring 27, the star wheel 14 may remain operative and the escapement member 18 may be brought into engagement with the star wheel. This provides for still slower speed of the shutter.

(d) For still another setting of the speed-setting ring 27, the star wheel 14 may remain operative and the escapement member 19 may be brought into engagement with the star wheel while the escapement member 18 is held inoperative or disengaged from the star wheel.

(e) For yet another setting of the speed-setting ring 27, the star wheel 14 may be kept operative, and both escapement members 18 and 19 may be made operative, to engage the star wheel, providing yet the slowest speed of the shutter.

It will now be seen, in accordance with the above structure, that a total of five retarded speeds are obtained by the speed retarding mechanism, in addition to a sixth unretarded speed, the extent of movement of the driving lever 5 being either nil for the unretarded speed or else at the fullest for all of the various retarded speeds.

The said five retarded speeds are obtained only by coupling or uncoupling the star wheel and the two escapement members, whereas the extent of movement of the driving lever 5 remains unchanged at all times. During the assembly of the various components of the retarding means as above set forth no adjusting work is necessary with regard to these various speeds, since they function in response to "on-off" settings which are determined unequivocally by the controlling cams carried by the speed setting ring 27.

Furthermore, the above retarded speeds have the greatest possible accuracy and uniformity, because they are all based on an equal and maximum extent of movement of the driving lever 5, and are not influenced by clearances between the meshing gears, etc. Moreover, the improved retarding mechanism of this invention is seen to be simple and compact, and to be devoid of critical components, as for example, spiral-shaped returning springs and the like.

The assembly of the various components may be done by personnel which is relatively unskilled or untrained, without adversely affecting the accuracy and uniformity of the results obtained.

The optional coupling and uncoupling of the star wheel 14 and escapement members 18 and 19 provide a greater number of retarded speeds than is possible in well-known prior shutters wherein a control is effected of the stroke of the driving member to obtain different shutter speeds. The retarding means of the invention is thus of special advantage, and may be modified to provide even more than the five retarding steps described above. Not only is there no adjustment or calibration procedure required of the present retarding means, but there is eliminated the small extent of travel of the driving member, which in the past has involved an inconstancy of speed.

Variations and modifications may be made within the scope of the claims, and portions of the improvement may be used without others.

I claim:

1. In a photographic shutter having a shutter drive mechanism, a multi-speed shutter movement retarding mechanism comprising a gear train having a plurality of intermeshing gear members including a high speed gear member, said members being at all times fully meshed and drivingly engaged with each other when the said retarding mechanism is operative to effect the different shutter speeds; means actuated by the shutter drive mechanism, for driving said gear train; a star wheel having gear teeth adapted to mesh with said high speed gear member; means for shifting gear said star wheel to connect it to and disconnect it from the high-speed gear member of the gear train, to alter the rate of running-down movement of said train; a pair of reciprocable reversibly movable escapement members adapted to respectively engage said star wheel to retard the movement thereof; a pair of mounting means enabling said escapement members respectively to be shifted into and out of engagement with said star wheel; a speed-setting member; and means responsive to movement of said speed-setting member for selectively actuating said star wheel shifting means and said escapement member mounting means to engage and disengage either one or both said escapement members with and from the star wheel and to connect and disconnect said wheel with and from the high speed gear member of the gear train.

2. The invention as defined in claim 1, in which the means responsive to movement of the speed-setting member comprises a plurality of cams carried by said member, and comprises cam followers respectively engaging said cams.

3. The invention as defined in claim 2, in which there are levers on which the escapement members and star wheel are turnably mounted and by which they are shifted, said levers carrying the said cam followers.

4. In a photographic shutter having a shutter drive mechanism, a multi-speed movement retarding mechanism comprising a gear train having a plurality of intermeshing gear members including a high speed gear member, said member being at all times fully meshed and drivingly engaged with each other when the said retarding mechanism is operative to effect the different shutter speeds; means actuated by the shutter-drive mechanism, for driving said gear train; a star wheel having gear teeth adapted to mesh with said high speed gear member; a pair of reciprocable reversibly movable escapement members adapted to respectively engage said star wheel to retard the movement thereof; a pair of mounting means enabling said escapement members respectively to be shifted into and out of engagement with said star wheel; a speed-setting member; and means responsive to movement of said speed-setting member for selectively actuating said mounting means to engage and disengage either one or both said escapement members with and from the star wheel.

5. In a photographic shutter having a shutter drive mechanism, a multi-speed movement-retarding mechanism comprising a gear train having a plurality of intermeshing gear members including a high speed gear member, said members being at all times fully meshed and drivingly engaged with each other when the said retarding mechanism is operative to effect the different shutter speeds; means actuated by the shutter drive mechanism, for driving said gear train; a star wheel having gear teeth adapted to mesh with said high speed gear member; means for shifting said star wheel to connect it to and disconnect it from the high-speed gear member of the gear train, to alter the rate of running-down movement of said train; a reciprocable reversibly movable escapement member adapted to engage said star wheel to retard the movement thereof; mounting means enabling said escapement member to be shifted into and out of engagement with said star wheel; a speed-setting member; and means responsive to movement of said speed-setting member for selectively actuating said star wheel shifting means and escapement member mounting means to engage and disengage said escapement member with and from the star wheel and to connect and disconnect said wheel with and from the high speed gear member of the gear train.

References Cited in the file of this patent

UNITED STATES PATENTS

| | | |
|---|---|---|
| 1,843,265 | Barenyi | Feb. 2, 1932 |
| 1,926,190 | Borden | Sept. 12, 1933 |
| 1,941,291 | Deckel et al. | Dec. 26, 1933 |
| 1,953,556 | Gitzhoven | Apr. 3, 1934 |
| 2,081,727 | Barenyi | May 25, 1937 |
| 2,090,070 | Riddell | Aug. 17, 1937 |